US009187303B2

(12) United States Patent
Pangrazio et al.

(10) Patent No.: US 9,187,303 B2
(45) Date of Patent: Nov. 17, 2015

(54) MATERIAL HANDLING DEVICE AND WEIGHING APPARATUS USABLE THEREWITH

(71) Applicants: John Alan Pangrazio, Island Lake, IL (US); Robert Thomas Pangrazio, Hudson, OH (US); Steve Mariea, Dover, OH (US)

(72) Inventors: John Alan Pangrazio, Island Lake, IL (US); Robert Thomas Pangrazio, Hudson, OH (US); Steve Mariea, Dover, OH (US)

(73) Assignee: LTS SCALE COMPANY, LLC, Twinsburg, OH (US)

( * ) Notice: Subject to any disclaimer, the term of this patent is extended or adjusted under 35 U.S.C. 154(b) by 0 days.

(21) Appl. No.: 14/503,862

(22) Filed: Oct. 1, 2014

(65) Prior Publication Data

US 2015/0093216 A1    Apr. 2, 2015

Related U.S. Application Data

(60) Provisional application No. 61/885,555, filed on Oct. 2, 2013.

(51) Int. Cl.
| | |
|---|---|
| *B66F 9/20* | (2006.01) |
| *B66F 17/00* | (2006.01) |
| *B66F 9/075* | (2006.01) |
| *G01G 19/08* | (2006.01) |

(52) U.S. Cl.
CPC ........... *B66F 17/003* (2013.01); *B66F 9/07504* (2013.01); *G01G 19/083* (2013.01)

(58) Field of Classification Search
USPC ............ 414/21, 631, 636; 177/136, 139, 128, 177/229; 187/237, 238; 73/862.59, 73/862.338, 862.381, 862.627
See application file for complete search history.

(56) References Cited

U.S. PATENT DOCUMENTS

| | | | | |
|---|---|---|---|---|
| 1,887,169 A | | 11/1932 | Ross | |
| 2,850,181 A | | 9/1958 | Hamblin | |
| 3,231,035 A | * | 1/1966 | Wise | ...................... B66F 17/003 414/21 |
| 3,910,363 A | * | 10/1975 | Airesman | ............ G01G 19/083 177/139 |
| 4,323,132 A | * | 4/1982 | Bradley | ............... G01G 19/083 177/139 |
| 4,421,186 A | * | 12/1983 | Bradley | ............... G01G 19/083 73/862.628 |

(Continued)

FOREIGN PATENT DOCUMENTS

DE        3744194 A1     7/1989

*Primary Examiner* — Paul T Chin
(74) *Attorney, Agent, or Firm* — Eckert Seamans Cherin & Mellott, LLC; Brij K. Agarwal (57) ABSTRACT

A weighing apparatus is usable in conjunction with a device such as a forklift and includes a front plate upon which a set of forks are placed, a rear plate that is mounted to a lift mechanism of the forklift, a pair of connection apparatuses that are situated between the front and rear plates, and a load cell apparatus that extends between the front and rear plates. Each connection apparatus includes an inboard rail and an outboard rail between which a number of rollable engagement structures are generally situated. The front plate is movable along a movement direction while being resisted from moving in any direction other than the movement direction. The connection apparatuses are configured to avoid binding between the inboard and outboard rails and enable the load cell apparatus to accurately provide an output that is representative of the weight of a load situated on the forks.

22 Claims, 6 Drawing Sheets

(56) References Cited

U.S. PATENT DOCUMENTS

| | | | | |
|---|---|---|---|---|
| 4,491,190 A * | 1/1985 | Mayfield | ................ | G01G 19/10 177/139 |
| 5,336,854 A * | 8/1994 | Johnson | ................ | G01G 3/1412 73/862.627 |
| 5,837,946 A * | 11/1998 | Johnson | ................ | G01G 3/1404 177/139 |
| 7,026,557 B2 * | 4/2006 | Rice | ................ | G01G 23/3728 177/136 |
| 8,353,388 B2 * | 1/2013 | Rice | ................ | B66F 9/07559 177/139 |
| 9,046,409 B2 * | 6/2015 | Siaw | ................ | B66F 9/20 177/136 |
| 2009/0260924 A1 * | 10/2009 | Rice | ................ | B66F 9/07559 187/238 |
| 2014/0133944 A1 * | 5/2014 | Pangrazio | ................ | B66F 9/0755 414/667 |
| 2014/0262552 A1 * | 9/2014 | Santi | ................ | G01G 3/14 177/211 |

* cited by examiner

MATERIAL HANDLING DEVICE AND WEIGHING APPARATUS USABLE THEREWITH

CROSS-REFERENCE TO RELATED APPLICATION

The instant application claims priority from U.S. Provisional Patent Application Ser. No. 61/885,555 filed Oct. 2, 2013, the disclosures of which are incorporated herein by reference.

BACKGROUND

1. Field

The disclosed and claimed concept relates generally to equipment for determining the weight of a load and, more particularly, to a weighing apparatus that is mountable to a device such as a material handling device or other such device.

2. Related Art

Numerous types of weighing devices are known in the relevant art. Spring-loaded scales, beam-type balancing scales, load cells, and the like are generally understood for use in accessing the weight of an object. Typically the object is placed on the scale, or the object's weight is somehow applied thereto, in order to provide some type of an output that is representative of the weight of the object. While such weighing devices have been generally effective for their intended purposes, they have not been without limitation.

Some environments involve mechanical relationships and/or geometries wherein the obtaining of an accurate weight of a load can be difficult if not impossible. An example of such a situation is where a material handling device such as a forklift is intended to not only lift and carry a load, but is also intended to detect and output the weight of the load.

As is generally understood in the relevant art, a conventional forklift includes a pair of forks that protrude from the front of the forklift and that carry the load thereon. The forks are movable in the vertical direction through the operation of a lift mechanism when the load is situated on the forks. Since the forks protrude from the front of the forklift, the center of mass of the load is offset to a location in front of the lift mechanism. The result is that such moment loading and the like is applied to any weighing device that is situated in the vicinity of the lift mechanism. Such load moments generate friction, binding, and other problems that affect the accuracy of the weight measurement. This is to be contrasted with, for example, a beam-type balance apparatus wherein the load is placed upon a platform that is suspended by wires that extend from a swivel mount of a type that enables the center of mass of the load to be situated vertically below the point at which the weight of the load is applied to the balance beam. Improvements thus would be desirable.

SUMMARY

An improved weighing apparatus is usable in conjunction with a material handling device such as a forklift. The weighing apparatus includes a front plate upon which a set of forks are placed, a rear plate that is mounted to a lift mechanism of the forklift, a pair of connection apparatuses that are situated between the front and rear plates and which employ a number of rollable engagement structures, and a load cell apparatus that extends between the front and rear plates. Each connection apparatus includes an inboard rail and an outboard rail between which the rollable engagement structures are generally situated. The rolling movement of the engagement structures with respect to either or both of the inboard and outboard rails permits the front plate to be movable along a movement direction (which may be the vertical direction) while resisting movement of the front plate with respect to the rear plate in any direction other than the movement direction. The connection apparatuses are configured to avoid binding between the inboard and outboard rails and enable the load cell apparatus to accurately provide an output that is representative of the weight of the load that is applied to the front plate.

Accordingly, an aspect of the disclosed and claimed concept is to provide an improved weighing apparatus that can be retrofitted to a device such as a material handling device or other device to enable the material handling device to accurately determine the weight of a load placed on a protuberant support.

Another aspect of the disclosed and claimed concept is to provide an improved material handling device that includes the aforementioned weighing apparatus.

Another aspect of the disclosed and claimed concept is to provide an improved weighing apparatus having a pair of supports that are capable of relative movement along a movement direction but are resisted from relative movement in directions other than in the movement direction.

Another aspect of the disclosed and claimed concept is to provide such a weighing apparatus wherein rollable engagement structures are employed to permit certain relative movement between the supports while avoiding certain other relative movement and while avoiding binding of any structures of the weighing apparatus with one another.

Accordingly, an aspect of the disclosed and claimed concept is to provide an improved weighing apparatus that is structured for use with a material handling device of a type that includes a lift mechanism and that further includes a protuberant platform which is structured to receive a load thereupon. The weighing apparatus can be generally stated as including a first support structured to be situated on the lift mechanism, a second support upon which the platform is structured to be situated, a load cell apparatus connected between the first support and the second support and that can be generally stated as including a load cell. The weighing apparatus can be generally stated as further including a pair of connection apparatuses disposed between the first and second supports, each connection apparatus of the pair of connection apparatuses comprising an inboard support, an outboard support, and a number of engagement structures situated generally between the inboard support and the outboard support and being movable with respect to at least one of the inboard support and the outboard support and thereby enabling at least one of the inboard support and the outboard support to move in a movement direction with respect to the other of the inboard support and the outboard support, at least a portion of the inboard support being situated generally between at least a portion of the outboard support and the other connection apparatus of the pair of connection apparatuses, the inboard supports being together mounted to one of the first support and the second support, the outboard supports being together mounted to the other of the first support and the second support, the pair of connection apparatuses permitting translational movement of the second support in the movement direction with respect to the first support that is sufficient to permit the first and second supports to engage the load cell and to thereby cause the load cell to output a signal that is representative of the load, and the pair of connection apparatuses being further structured to resist movement of the second support with respect to the first support in any direction other than translational movement in the movement direction.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
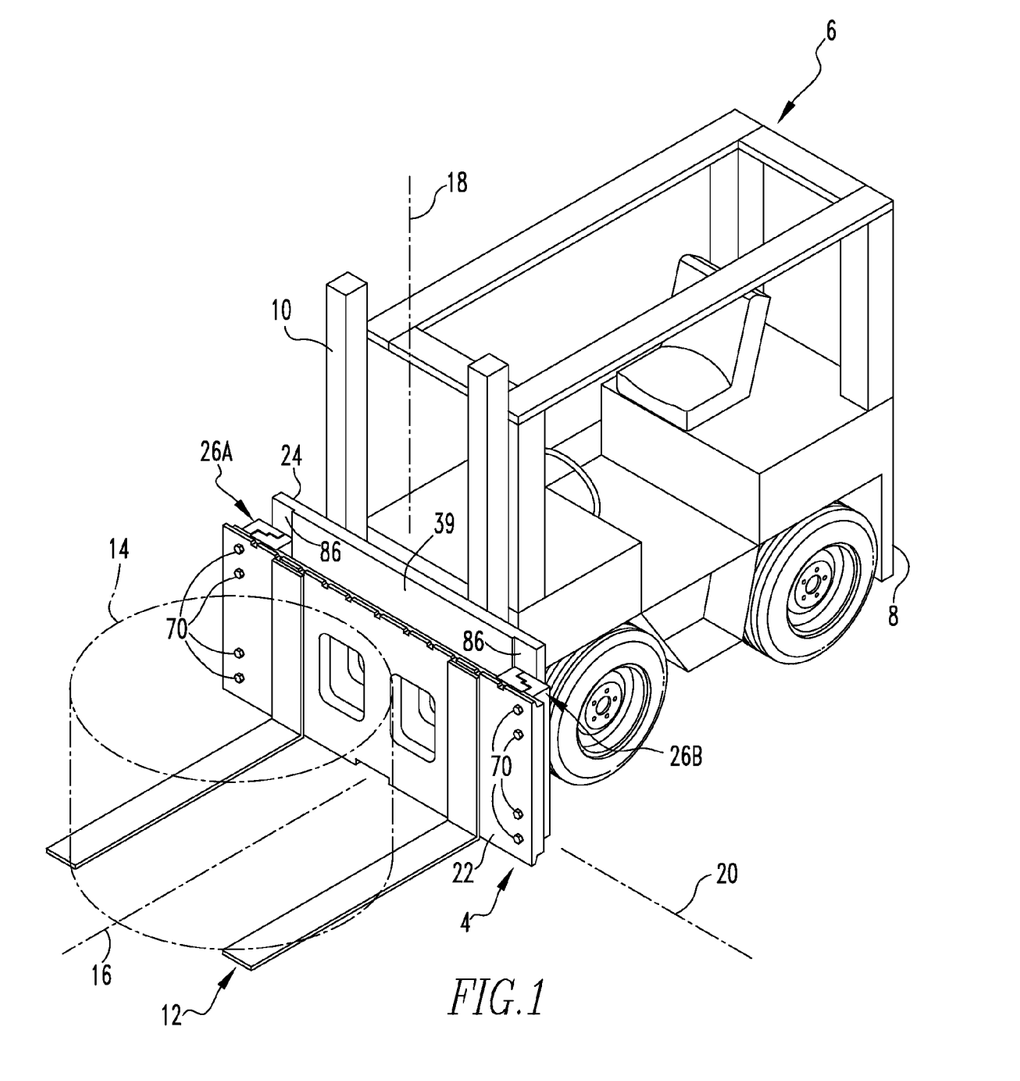
FIG. 1 is a schematic perspective view of an improved material handling device in accordance with the disclosed and claimed concept that incorporates an improved weighing apparatus in accordance with an embodiment of the disclosed and claimed concept.

An improved weighing apparatus 4 in accordance with one embodiment of the disclosed and claimed concept is depicted in FIG. 1 as being a part of an improved material handling device 6 that is likewise in accordance with the disclosed and claimed concept. The exemplary material handling device 6 that is depicted herein is a forklift truck that further includes a truck 8, a lift mechanism 10, and a set of forks 12. It is understood, however, that the weighing apparatus 4 can be implemented in any of a variety of types of material handling devices such as tipper lifts and other devices without departing from the present concept.

As is depicted generally in FIG. 1, the forks 12 are situated on the weighing apparatus 4, and the weighing apparatus 4 is, in turn, mounted to the lift mechanism 10. The lift mechanism 10 includes a pair of masts that are mounted to the truck 8. The truck 8 includes an engine or other type of device that provides motile force to a set of wheels to enable the material handling device 6 to be driven and steered from one location to another. It is understood that the weighing apparatus 4 can be not only provided with a material handling device 6 as a part of the original equipment, but the weighing apparatus 4 can additionally be employed to retrofit an existing forklift or other such device to result in the improved material handling device 6.

It can further be seen from FIG. 1 that the forks 12 form a protuberant platform that protrudes from the weighing apparatus 4 in a protrusion direction 16 which can generally be described as being generally parallel with the forward direction of motion of the exemplary material handling device 6. The lift mechanism 10 is configured to move the weighing apparatus 4 and the forks that are situated thereon, plus a load 14 that is situated on the forks 12, along a movement direction 18 that is generally orthogonal to the protrusion direction 16 and that is depicted in an exemplary fashion as being in the vertical direction from the perspective of FIG. 1. As will be described in greater detail below, the weighing apparatus 4 is configured to permit certain relative movement of some of its components along the movement direction 18 while resisting relative movement of such structures in directions other than the movement direction, which would include resisting movement in the protrusion direction 16 and in a lateral direction 20 that is mutually orthogonal to the protrusion direction 16 and the movement direction 18. By resisting such relative movement in directions other than the movement direction 18, the improved weighing apparatus 4 avoids binding of the various structures of the weighing apparatus 4 with one another, which therefore avoids friction therebetween and permits an accurate measurement of the weight of the load 14.

Figure 2:
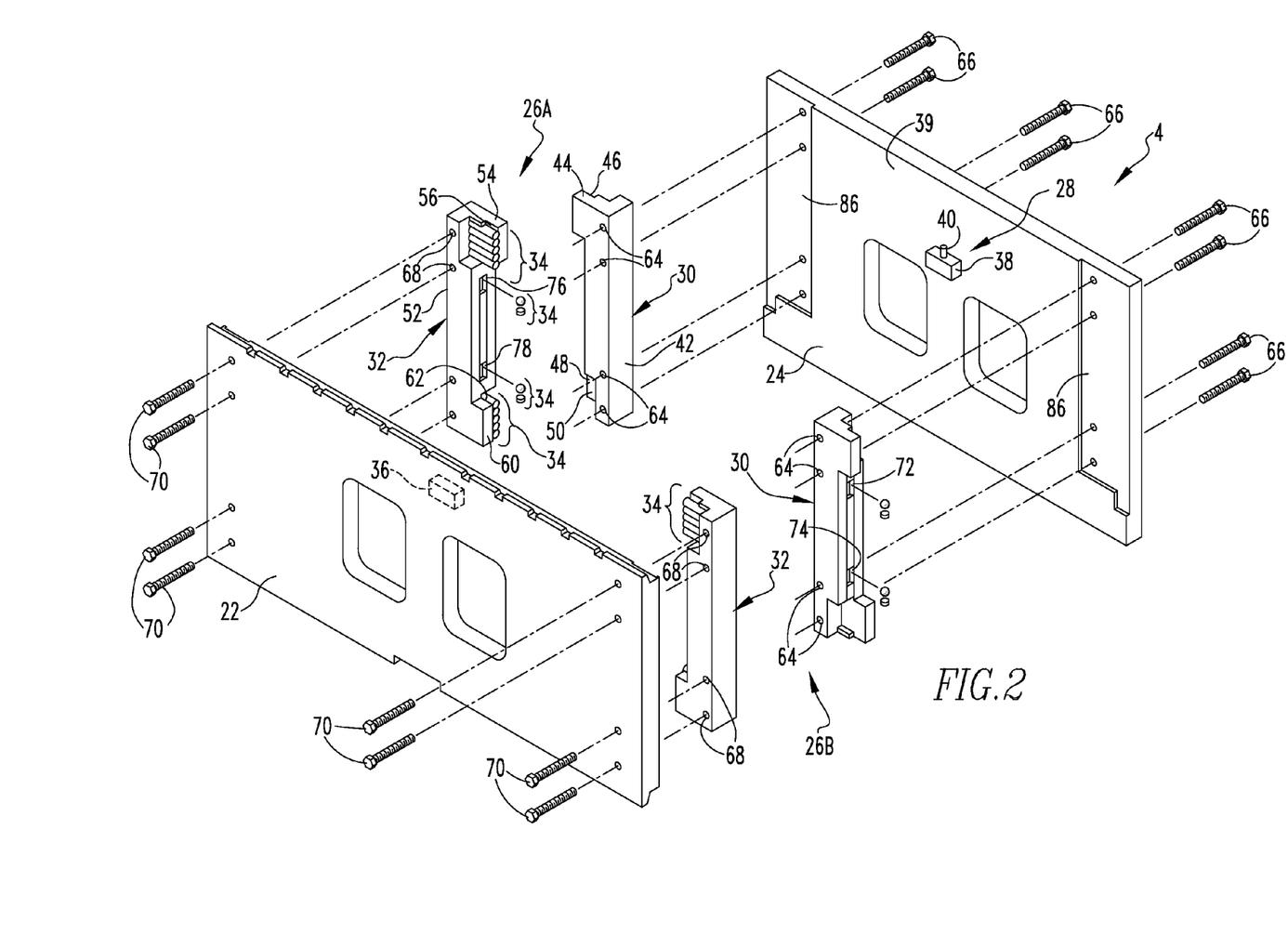
FIG. 2 is a schematic exploded view of the weighing apparatus of FIG. 1.

As can be seen in FIG. 2, the weighing apparatus 4 includes a front plate 22 that serves as a support, a rear plate 24 that serves as another support, a pair of connection apparatuses 26A and 26B, and a load cell apparatus 28. The front and rear plates 22 and 24 are each plate-like structures that are of a generally planar nature and that are oriented parallel with one another and spaced apart. The connection apparatuses 26A and 26B are each interposed between the front and rear plates 22 and 24 and are spaced apart from one another along the lateral direction 20 to be situated generally at the marginal regions of the front and rear plates 22 and 24.

The connection apparatuses 26A and 26B that are depicted in FIGS. 1 and 2 are mirror images of one another and each include an inboard rail 30 that serves as an inboard support, an outboard rail 32 that serves as an outboard support, and a number of engagement structures 34 that are interposed in various fashions between the inboard and outboard rails 30 and 32. As employed herein, the expression "a number of" and variations thereof shall refer broadly to any non-zero quantity, including a quantity of one. The exemplary engagement structures 34 that are depicted herein include rollable structures that are at least partially rounded and that may be in the form of spheres or cylinders, by way of example, or other shapes, and further include other structures that will be set forth in greater detail below.

As will also be set forth in greater detail below, the engagement structures 34 are movable with respect to at least one of the inboard rail 30 and the outboard rail 32 and thereby permit at least one of the inboard rail 30 and the outboard rail 32 to be movable with respect to the other of the inboard rail 30 and the outboard rail 32. The engagement structures 34 further resist relative movement between the inboard rail 30 and the outboard rail 32 in the protrusion direction 16 and in the movement direction 18, meaning that the engagement structures 34 resist relative movement of the inboard and outboard rails 30 and 32 with respect to one another in directions other than the movement direction 18. Such resistance to movement in directions other than the movement direction 18 advantageously avoids binding of the structures of the connection apparatuses 26A and 26B and thus enables the load cell apparatus 28 to have applied thereto a loading that is representative in an accurate fashion of the load 14, which enables the load cell apparatus 28 to thereby generate an output that is representative of the weight of the load 14 in an accurate and Legal for Trade fashion.

The schematically-depicted load cell apparatus 28 includes an upper plate 36 that is affixed to a surface 37 of the front plate 22, a lower plate 38 that is affixed to a surface 39 of the rear plate 24, and a load cell 40 that is situated on the lower plate 38 and that is interposed between the upper and lower plates 36 and 38. When the load 14 is applied to the forks 12, the weight thereof causes a slight movement of the front plate 22 in the movement direction 18 with respect to the rear plate 24 which engages the upper plate 36 with the load cell 40 and applies to the load cell 40 an accurate representation of the weight of the load 14. This enables the load cell 40 to generate an output that is representative of the weight of the load 14. In this regard, it is understood that the load cell 40 generates as an output some type of an electronic signal that is detected by a computer and that is subject to various processing on the computer that may include storage and other operations on the computer.

In the depicted exemplary embodiment, the surfaces 37 and 39 are oriented generally parallel with one another and are in a face-to-face relationship, meaning that they confront one another. The surfaces 37 and 39 more particularly confront one another and overlap one another along the protrusion direction 16.

Since, as mentioned above, the connection apparatuses 26A and 26B are mirror images of one another, the connection apparatuses 26A and 26B may be collectively and individually referred to herein with the numeral 26. As will be understood from the description provided herein and the drawings that are provided herewith, the exemplary inboard and outboard rails 30 and 32 are identical to one another and are merely arranged in different orientations with respect to the front and rear plates 22 and 24. Despite such similarity between the components thereof, the connection apparatus 26 will be described herein in terms of it including the inboard rail 30, the outboard rail 32, and the engagement structures 34.

Figure 3:
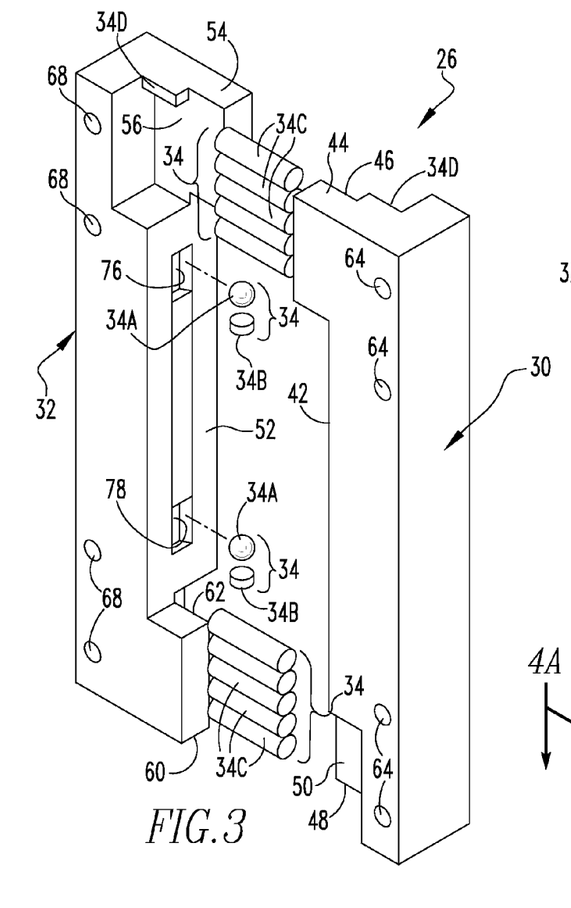
FIG. 3 is an enlarged exploded perspective view of a portion of the weighing apparatus of FIG. 2.

As can be understood from FIGS. 2 and 3, the inboard rail 30 includes an inboard shank 42 that is elongated along the movement direction 18. The inboard rail 30 further includes a first inboard lug 40 having a first inboard lug face 46 and being situated at a first end of the inboard shank 42. Moreover, the inboard rail 30 includes a second inboard lug 48 having a second inboard lug face 50 and being situated at a second, opposite end of the inboard shank 42. The first and second inboard lugs 44 and 48 are spaced apart from one another along the movement direction 18. The first and second inboard lugs 44 and 48 extend from the inboard shank 42 in generally the same direction, which is in a direction generally toward the outboard rail 32 and away from the opposite connection apparatus 26. It can also be seen that the first and second inboard lugs 44 and 48 each extend from the inboard shank 42 in a direction generally transverse to its longitudinal extent. However, the first and second inboard lug faces 46 and 50 face in generally opposite directions along the protrusion direction 16.

The outboard rail 32 likewise includes an elongated outboard shank 52, a first outboard lug 54 having a first outboard lug face 56 and being situated at a first end of the outboard shank 52, and a second outboard lug 60 having a second outboard lug face 62 and being situated at a second, opposite end of the outboard shank 52. The first and second inboard lug faces 46 and 50 and the first and second outboard lug faces 56 and 62 are each of a generally planar configuration for reasons that will be set forth in greater detail below.

The first and second inboard and outboard lugs 44, 48, 54, and 60 each serve as retention structures that resist movement of the front plate 22 in a direction along the protrusion direction 16 with respect to the rear plate 24. The first and second inboard lugs 44 and 48 overlap and confront one another along the protrusion direction 16, and the first and second outboard lugs 54 and 60 likewise overlap and confront one another along the protrusion direction 16.

As is best shown in FIG. 2, the inboard rail 30 has a plurality of inboard fastening holes 64 formed therein that are threaded and that are cooperable with a set of inboard bolts 66 to affix the inboard rail 30 to the rear plate 24. In a likewise fashion, the outboard rail 32 has a plurality of outboard fastener holes 68 that are threaded and that are cooperable with a set of outboard bolts 70 to mount the outboard rail 32 to the front plate 22. That is, the inboard rails 30 of the connection apparatuses 26A and 26B are together mounted to the rear plate 24, and the outboard rails 32 of the connection apparatuses 26A and 26B are together mounted to the front plate 22. It is understood, however, that different methodologies can be employed to attach the inboard rails 30 and the outboard rails 32 to the rear and front plate 24 and 22, respectively.

Figure 4:
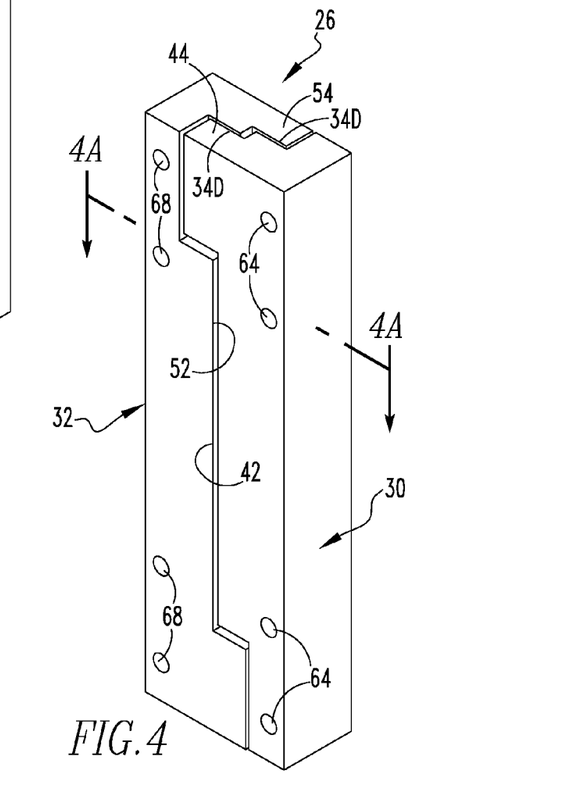
FIG. 4 is an assembled view of the elements that are depicted generally in FIG. 3.

The inboard rail 30 is depicted in FIGS. 2 and 3 as including a first inboard receptacle 72 and a second inboard receptacle 74 that are formed in the inboard shank 42 and that are spaced apart from one another along the movement direction 18. The first and second inboard receptacles 72 and 74 are each elongated, at least slightly, along the movement direction 18. The outboard rail 32 likewise has a first outboard receptacle 76 and a second outboard receptacle 78 that are formed in the outboard shank 52, that are similarly spaced apart, and that are each elongated, at least slightly, along the movement direction 18. When the inboard and outboard rails 30 and 32 are assembled to one another, as is depicted in FIG. 4, the first inboard and outboard receptacles 72 and 76 confront one another along the lateral direction 20, and the second inboard and outboard receptacles 74 and 78 likewise confront one another along the lateral direction 20.

As is best shown in FIG. 3, a spherical engagement structure 34A of the number of engagement structures 34 is received in the confronting first inboard and outboard receptacles 72 and 76, and a polymeric engagement structure 34B of the number of engagement structures 34 is disposed vertically below the spherical engagement structure 34A within the first inboard and outboard receptacles 72 and 76. The polymeric engagement structure 34B is, in the example depicted herein, formed of Delrin, although other appropriate materials may be employed without departing from the present concept. Another spherical engagement structure 34A and another polymeric engagement structure 34B that is situated vertically therebelow are likewise received in the second inboard and outboard receptacles 74 and 78.

Figure 4A:
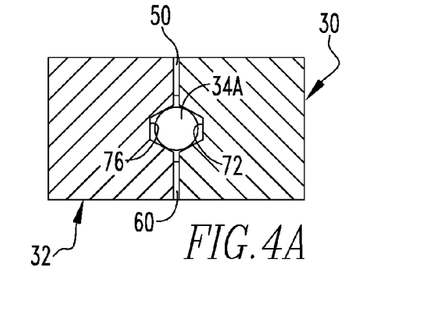
FIG. 4A is a sectional view as taken along line 4A-4A of FIG. 4.

The spherical engagement structures 34A are each engageable with the corresponding polymeric engagement structure 34B, and the polymeric engagement structures 34B provide a low friction interface to avoid the spherical engagement structures 34A from binding with other structures of the connection apparatuses 26. The spherical engagement structures 34A and/or the first and second inboard and outboard receptacles 72, 74, 76, and 78 are shaped and sized such that the inboard and outboard shanks 42 and 52 remain at least slightly spaced apart when the connection apparatus is assembled, as is depicted generally in FIGS. 4 and 4A, which advantageously further resists the inboard and outboard shanks 42 and 52 from binding against one another. In this regard, it can be understood that the first and second inboard and outboard receptacles 72, 74, 76, and 78 are each of an approximately trapezoidal cross-section whereby the spherical engagement structures 34A engage the non-parallel surfaces of the opposed first and second inboard and outboard receptacles 72, 74, 76, and 78. The spherical engagement structures 34A area each rollably movable with respect to at least one of the inboard and outboard shanks 42 and 52 to permit relative movement of the inboard and outboard shanks 42 and 52 along the movement direction 18.

Such reception of the spherical engagement structures 34 in the first and second inboard and outboard receptacles 72, 74, 76, and 78 furthermore resists movement of the front plate 22 with respect to the rear plate 24 along the lateral direction 20. More particularly, as a result of the spherical engagement structures 34 being received in the first and second inboard and outboard receptacles 72, 74, 76, and 78, the inboard and outboard shanks 42 and 52 of each connection apparatus 26 can be situated no closer to one another than is depicted generally in FIGS. 4 and 4A. Since, as can be seen in FIG. 2, the inboard rails 30 are situated adjacent one another (albeit spaced apart), and the two inboard rails 30 are furthermore situated between the two outboard rails 32, the reception of the spherical engagement structures 34A between each inboard rail 30 and its corresponding outboard rail 32 resists any movement of either of the inboard and outboard rails 30 and 32 with respect to one another in the lateral direction 20. This is because both of the inboard rails 30 are affixed to the rear plate 24, and both outboard rails 32 are affixed to the front plate 22. As such, the spherical engagement structures 34A resist relative movement of the front and rear plates 22 and 24 along the lateral direction 20 while permitting movement of the outboard rails 32 with respect to the inboard rails 30 along the movement direction 18. The spherical engagement structures 34A can additionally be said to resist relative movement of the front and rear plates 22 and 24 along the protrusion direction 16 while permitting relative movement of the inboard and outboard rails 30 and 32 along the movement direction 16.

During assembly, the inboard rails 30 may be engaged with the spherical engagement structures 34A and the corresponding outboard rails 32 with a predetermined compressive preload in order to retain the connection apparatuses 26 in the assembled condition that is depicted generally in FIG. 4. In this regard, certain of the inboard and/or outboard fastener holes 64 and 68 may be elongated along the lateral direction 20 to permit such lateral preloading of the connection apparatuses 26 prior to tightening of the inboard and/or outboard bolts 66 and 70.

As can further be understood from FIGS. 3 and 4, a set of cylindrical engagement structures 34C of the number of engagement structures 34 are interposed between the first inboard and outboard lugs 44 and 54 and, more particularly, are engaged between the first inboard and outboard lug faces 46 and 56. In this regard, the first inboard and outboard lug faces 46 and 56 can be understood to be confronting one another along the protrusion direction 16, with the number of cylindrical engagement structures 34C being interposed therebetween when the connection apparatus 26 is in the assembled condition that is depicted generally in FIG. 4. Likewise, another set of the cylindrical engagement structures 34C are interposed between the second inboard and outboard lug faces 50 and 62 of the second inboard and outboard lugs 48 and 60 when the second inboard and outboard lug faces 50 and 62 are in a confronting arrangement along the protrusion direction 16 in the assembled condition of the connection apparatus 26. In this regard, the first inboard and outboard lugs 44 and 54 can be seen to overlap one another along the protrusion direction 16 when the connection apparatus 26 is in the assembled configuration of FIG. 4, and the second inboard and outboard lugs 48 and 60 likewise overlap one another along the protrusion direction 16 when the connection apparatus 26 is in its assembled condition.

It thus can be seen that the reception of the cylindrical engagement structures 34C between the first inboard and outboard lugs 44 and 54 and between the second inboard and outboard lugs 48 and 60 resists relative movement of any portions of the inboard and outboard rails 30 and 32 with respect to one another along the protrusion direction (i.e., in the front and rear directions of the truck 8) while permitting such relative movement along the movement direction 18. This is because the set of cylindrical engagement structures 34C are rollable along the movement direction 18 with respect to at least one of the first inboard lug 44 and the first outboard lug 54, and because the other set of cylindrical engagement structures 34C are rollable along the movement direction 18 with respect to at least one of the second inboard lug 48 and the second outboard lug 60. A stop 34D is provided on each of the first and second inboard and outboard lugs 44, 48, 54, and 60 to avoid the cylindrical engagement structures 34C from being lost as a result of such relative movement along the movement direction 18.

Moreover, it can be understood that the first outboard lug 54 and the corresponding cylindrical engagement structures 34C are disposed between the first inboard lug 44 and the rear plate 24 whereas the second outboard lug 60 and the corresponding cylindrical engagement structures 34C are disposed between the second inboard lug 48 and the front plate 22. Such an arrangement advantageously resists the moment loads that are applied by the forks 12 to the front plate 22 from causing binding between the inboard and outboard rails 30 and 32. More particularly, when the load 14 is applied to the forks 12 in the fashion depicted generally in FIG. 1, or when merely the weight of the forks 12 is applied to the front plate 24, the moment forces applied by the forks 12 to the front plate 22 tend to pull the upper portion of the front plate 22 (from the perspective of FIG. 1) in a direction generally away from the rear plate 24 whereas the same moment forces cause the lower portion of the front plate 22 (from the perspective of FIG. 1) to be compressively engaged toward the rear plate 24. By configuring the first and second inboard and outboard lugs 44, 48, 54, and 60 in the fashion depicted in FIG. 2, along with the corresponding cylindrical engagement structures 34C situated therebetween, such moment loads are applied directly to the cylindrical engagement structures 34C which resist movement of any portion of the front plate 22 with respect to the rear plate 24 along the protrusion direction 16 while permitting movement of the front plate 22 with respect to the rear plate 24 in the movement direction 18.

Figure 5A:
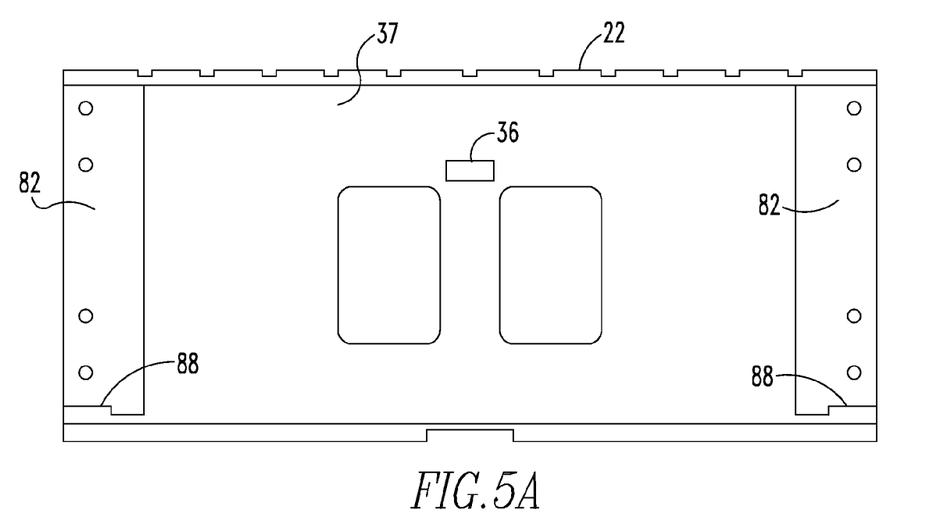
FIG. 5A is an elevational view of a surface of a front plate of the weighing apparatus of FIG. 2.
Figure 5B:
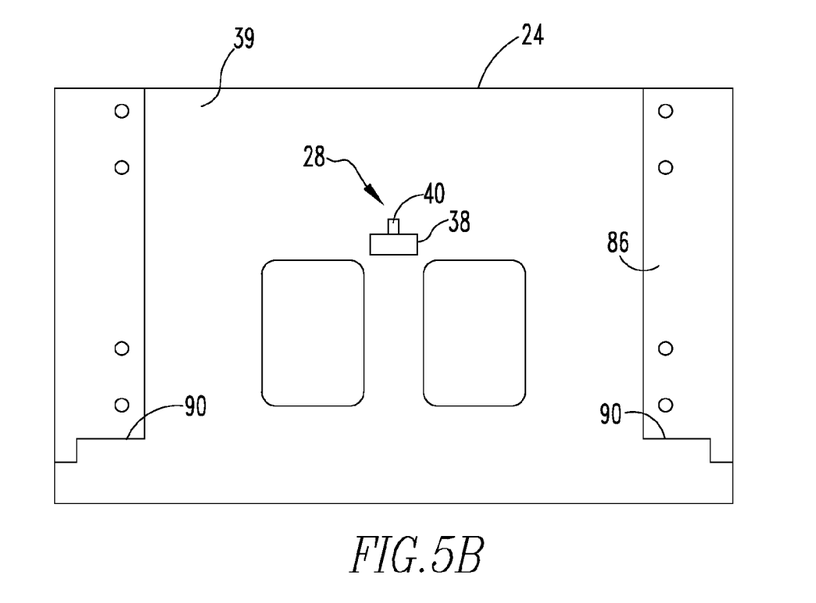
FIG. 5B is an elevational view of a surface of a rear plate of the weighing apparatus of FIG. 2.

In order to enhance the securement of the inboard rails 30 to the rear plate 24, and as is depicted generally in FIGS. 2 and 5B, the surface 39 of the rear plate 24 has a pair of inboard indentations 86 formed therein that are configured to receive the inboard shank 42 and the second inboard lug 40. In order to provide additional securement of the outboard rails 32 to the front plate 22, and as is depicted generally in FIG. 5A, the surface 37 has a pair of outboard indentations 82 formed therein that are configured to receive the outboard shank 52 and the second outboard lug 60. The bottom-most edge (from the perspective of FIG. 5A) of each of the outboard indentations 82 provide an outboard ledge 88 that is engaged with the outboard shank 52 and the second outboard lug 60 and which thereby provides vertical support, i.e., support along the movement direction 18, to the entire outboard rail 32. Likewise, the bottom-most edge (from the perspective of FIGS. 2 and 5B) of each inboard indentation 86 provides an inboard ledge 90 that is engageable with the inboard shank 42 and the second inboard lug 48 and provides vertical support along the movement direction 18 to the entire inboard rail 30.

Such outboard and inboard ledges 88 and 90 facilitate retention of the outboard and inboard rails 32 and 30 respectively, with respect to the front and rear plates 22 and 24 and with respect to one another, without the need to rely solely upon the shear strength and the torque-based tensile loading of the inboard and outboard bolts 66 and 70 to provide such retention. This advantageously avoids deformation of the inboard and outboard rails 30 and 32, which correspondingly avoids binding of any of the structures of the weighing apparatus 4 with one another. This promotes movement of the front plate 22 with respect to the rear plate 24 along the movement direction 18 while resisting relative movement therebetween along the protrusion direction 16 and the lateral direction 20. The configuration of the weighing apparatus 4 thus advantageously enables the weight of the load 14 to be accurately applied to the load cell 40 to enable the load cell 40 to output a signal that is representative of the weight of the load 14 with a Legal for Trade accuracy.

Figure 6:
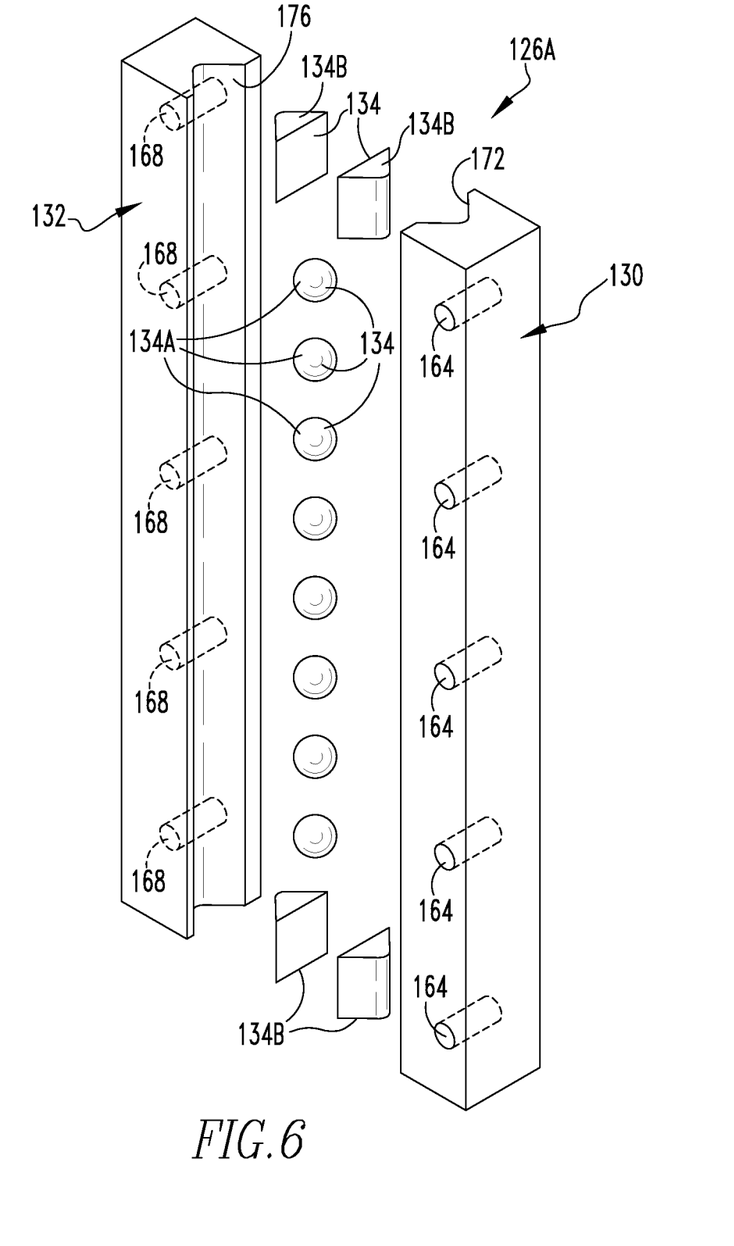
FIG. 6 is a schematic exploded view of an improved connection apparatus that is usable with another improved weighing device in accordance with an alternative embodiment of the disclosed and claimed concept.

An improved connection apparatus 126A in accordance with an alternative embodiment of the disclosed and claimed concept is depicted generally in FIG. 6 in an exploded condition. The connection apparatus 126A is one of a pair of connection apparatuses 126A and 126B that are mirror images of one another and that are usable in an improved weighing apparatus 104 in accordance with an alternative embodiment of the disclosed and claimed concept. The weighing apparatus 104 can be employed in place of the weighing apparatus 4 to form another embodiment of the material handling device 6.

Figure 7:
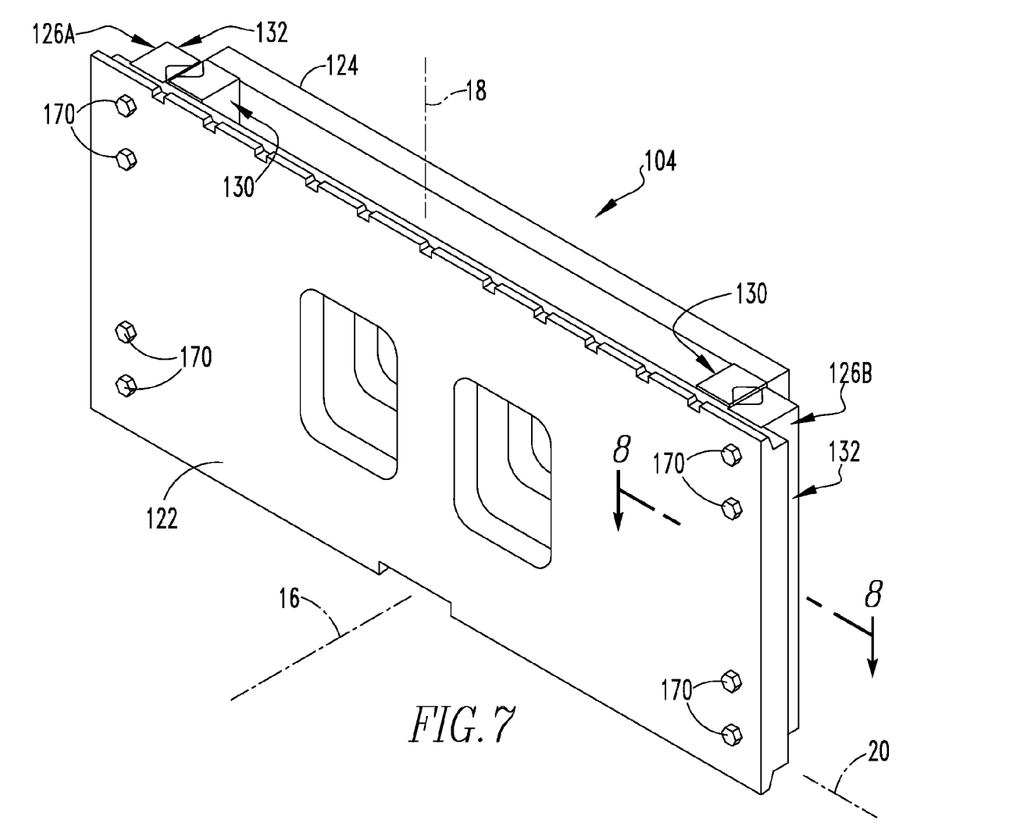
FIG. 7 is a schematic perspective view of the alternative weighing apparatus that employs the connection apparatus of FIG. 7.

As can be understood from FIG. 7, the improved weighing apparatus 104 includes a front plate 122 and a rear plate 124, and disposed therebetween are the pair of connection apparatuses 126A and 126B (which may be referred to herein collectively or individually with the numeral 126). The connection apparatuses 126 permit movement of the front plate 122 with respect to the rear plate 124 along the movement direction 18 while resisting relative movement therebetween along the protrusion direction 16 and along the lateral direction 20.

The connection apparatus 126 includes an inboard rail 130 and an outboard rail 132 along with a number of engagement structures 134. The inboard rail 130 has an inboard receptacle 172 formed therein that is elongated and that extends along the longitudinal extent of the inboard rail 130. The outboard rail 132 likewise has an outboard receptacle 176 formed therein that is elongated and that extends along the longitudinal extent of the outboard rail 132.

Figure 8:
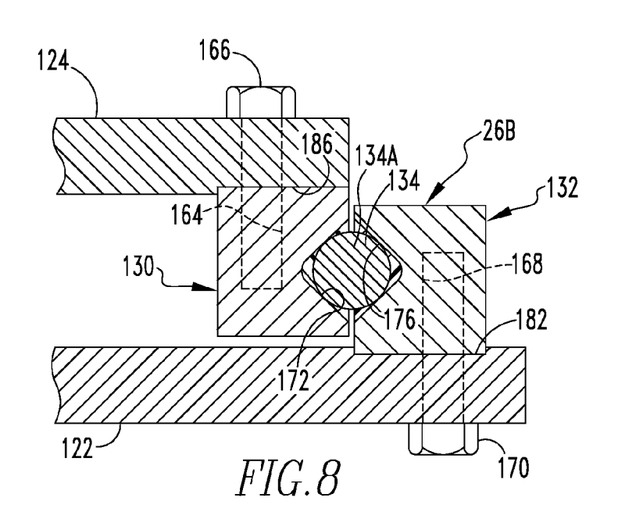
FIG. 8 is a sectional view as taken along line 8-8 of FIG. 7.

As can be understood from FIGS. 6 and 8, the engagement structures 134 include a plurality of spherical engagement structures 134A that are received in the inboard and outboard receptacles 172 and 176 when the connection apparatus 126 is in the assembled condition depicted generally in FIGS. 7 and 8. The engagement structures further include a number of polymeric engagement structures 134B that are generally wedge-shaped and that are received in the inboard and outboard receptacles 172 and 176 at the marginal regions thereof. The polymeric engagement structures 134B are, in the depicted exemplary embodiment, formed of Delrin and retain the spherical engagement structures 134A between the inboard and outboard receptacles 172 and 176 while resisting binding of any of the structures of the connection apparatus 126 with one another. The polymeric engagement structures 134B can be affixed to the inboard receptacle 172 and the outboard receptacle 176 in any of a variety of fashions, such as with the use of threaded fasteners, retention structures, and the like without limitation.

As can be understood from FIGS. 6 and 8, the inboard rail 130 has a set of inboard fastener holes 164 formed therein that are threaded and that are cooperable with a set of inboard bolts 166 to mount the inboard rail to the rear plate 124. Likewise, the outboard rail 132 has a set of outboard fastener holes 168 formed therein that are threaded and that are cooperable with a set of outboard bolts 170 to attach the outboard rail 132 to the front plate 122.

As can further be seen in FIG. 8, the front and rear plates 122 and 124 each have a pair of outboard and inboard indentations 182 and 186 formed therein, respectively, that receive therein the outboard and inboard rails 132 and 130, respectively. The outboard and inboard indentations 182 and 186 each terminate at their lower ends (from the perspective of FIG. 7) at a ledge that is engageable with the bottom edge of the outboard and inboard rails 132 and 130, respectively. These ledges, which are similar to the inboard and outboard ledges 90 and 88, provide support to the outboard and inboard rails 132 and 130, and to help retain the outboard and inboard rails 132 and 130 in position with respect to one another and with respect to the front and rear plates 122 and 124.

It can be seen that the reception of the spherical engagement structures 134 in the inboard and outboard receptacles 172 and 176 resists relative motion between the inboard and outboard rails 130 and 132 in the protrusion and lateral directions 16 and 20 while permitting relative movement therebetween along the movement direction 18. This is due at least in part to the fact that the spherical engagement structures 134A are rollably movable with respect to at least one of the inboard and outboard rails 130 and 132, which enables relative movement between the inboard and outboard rails 130 and 132 along the movement direction 18. The resisting of relative movement along the protrusion and lateral directions 16 and 20 resists binding of the structures of the weighing apparatus 104 with one another, which advantageously permits the weight of the load 14 to be accurately applied to a load cell apparatus of the weighing apparatus 104, the thereby permit the load cell apparatus of the weighing apparatus 104 to output a signal that is representative of the weight of the load 14 with a Legal for Trade accuracy.

It should be understood from the foregoing that various engagement structures in the form of spheres, cylinders, or a combination thereof can be employed in the various embodiments of the weighing apparatuses 4 and 104 without departing from the present concept. The selection of cylinders and/or spheres can be based upon the requirements of the particular application or upon other factors.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A weighing apparatus structured for use with a material handling device of a type that includes a lift mechanism and that further includes a protuberant platform which is structured to receive a load thereupon, the weighing apparatus comprising:
   a first support structured to be situated on the lift mechanism;
   a second support upon which the platform is structured to be situated;
   a load cell apparatus connected between the first support and the second support and comprising a load cell;
   a pair of connection apparatuses disposed between the first and second supports;
   each connection apparatus of the pair of connection apparatuses comprising an inboard support, an outboard support, and a number of engagement structures situated generally between the inboard support and the outboard support and being movable with respect to at least one of the inboard support and the outboard support and thereby enabling at least one of the inboard support and the outboard support to move in a movement direction with respect to the other of the inboard support and the outboard support, at least a portion of the inboard support being situated generally between at least a portion of the outboard support and the other connection apparatus of the pair of connection apparatuses;

the inboard supports being together mounted to one of the first support and the second support;

the outboard supports being together mounted to the other of the first support and the second support; and the pair of connection apparatuses permitting translational movement of the second support in the movement direction with respect to the first support that is sufficient to permit the first and second supports to engage the load cell and to thereby cause the load cell to output a signal that is representative of the load, the pair of connection apparatuses being further structured to resist movement of the second support with respect to the first support in any direction other than translational movement in the movement direction.

2. The weighing apparatus of claim 1 wherein, for each connection apparatus of the pair of connection apparatuses, the inboard and outboard supports comprise a number of retention structures that confront one another along a protrusion direction that is substantially orthogonal to the movement direction and that are structured to resist movement of the second support with respect to the first support in the protrusion direction, and wherein the first support and the second support overlap one another along the protrusion direction.

3. The weighing apparatus of claim 2 wherein, for each connection apparatus of the pair of connection apparatuses, at least some of the retention structures of the number of retention structures comprise an inboard lug that is situated at an end of the inboard support and an outboard lug that is situated at an end of the outboard support, the inboard lug and the outboard lug confronting one another along the protrusion direction and being structured to resist movement of the second support in the protrusion direction with respect to the first support, at least some of the engagement structures of the number of engagement structures being interposed between the inboard lug and the outboard lug and being movable with respect to at least one of the inboard lug and the outboard lug to permit translational movement in the movement direction of at least one of the inboard support and the outboard support with respect to the other of the inboard support and the outboard support.

4. The weighing apparatus of claim 3 wherein, for each connection apparatus of the pair of connection apparatuses, at least some of the retention structures of the number of retention structures further comprise another inboard lug that is situated at another end of the inboard support and another outboard lug that is situated at another end of the outboard support, the another inboard lug and the another outboard lug confronting one another along the protrusion direction and being structured to resist movement of the second support in the protrusion direction with respect to the first support, at least a portion of the engagement structures of the number of engagement structures being interposed between the another inboard lug and the another outboard lug and being movable with respect to at least one of the another inboard lug and the another outboard lug to permit translational movement along the movement direction of at least one of the inboard support and the outboard support with respect to the other of the inboard support and the outboard support.

5. The weighing apparatus of claim 4 wherein, for each connection apparatus of the pair of connection apparatuses:

the inboard lug being situated adjacent one of the first support and the second support, the outboard lug being situated adjacent the other of the first support and the second support, and the outboard lug and the at least some of the engagement structures being disposed between the inboard lug and the other of the first support and the second support; and the another inboard lug being situated adjacent the other of the first support and the second support, the another outboard lug being situated adjacent the one of the first support and the second support, and the another outboard lug and the at least portion of the engagement structures being disposed between the another inboard lug and the one of the first support and the second support.

6. The weighing apparatus of claim 5 wherein the at least some of the engagement structures are each at least partially rounded and are rollable between the inboard lug and the outboard lug, and wherein the at least portion of the engagement structures are each at least partially rounded and are rollable between the another inboard lug and the another outboard lug.

7. The weighing apparatus of claim 6 wherein the at least some of the engagement structures and the at least portion of the engagement structures are at least one of generally cylindrical and generally spherical in shape.

8. The weighing apparatus of claim 4 wherein, for each connection apparatus of the pair of connection apparatuses:

the inboard support comprises an elongated inboard shank;

the outboard support comprises an elongated outboard shank;

the inboard lug and the another inboard lug each extending from the inboard shank in a direction generally transverse to its longitudinal extent; and the outboard lug and the another outboard lug each extending from the outboard shank in a direction generally transverse to its longitudinal extent.

9. The weighing apparatus of claim 4 wherein, for each connection apparatus of the pair of connection apparatuses:

the inboard lug and the another inboard lug each extend from the inboard shank in a direction generally away from the inboard support of the other connection apparatus of the pair of connection apparatuses; and the outboard lug and the another outboard lug each extend from the outboard shank in a direction generally toward the outboard support of the other connection apparatus of the pair of connection apparatuses.

10. The weighing apparatus of claim 4 wherein, for each connection apparatus of the pair of connection apparatuses:

the inboard lug has an inboard lug face that is engageable with the at least some of the retention structures;

the another inboard lug has another inboard lug face that is engageable with the at least portion of the retention structures;

the outboard lug has an outboard lug face that is engageable with the at least some of the retention structures;

the another outboard lug has another outboard lug face that is engageable with the at least portion of the retention structures;

the inboard lug face and the another inboard lug face facing in opposite directions along the protrusion direction; and the outboard lug face and the another outboard lug face facing in opposite directions along the protrusion direction.

11. The weighing apparatus of claim 4 wherein, for each connection apparatus of the pair of connection apparatuses:
the inboard support has an elongated receptacle formed therein;
the outboard support has another elongated receptacle formed therein;
the receptacle and the another receptacle confronting one another along a lateral direction that is generally orthogonal to the movement and protrusion directions; and
at least a first engagement structure of the number of engagement structures is received in the receptacle and the another receptacle and is movable with respect to at least one of the inboard support and the outboard support to permit translational movement along the movement direction of at least one of the inboard support and the outboard support with respect to the other of the inboard support and the outboard support.

12. The weighing apparatus of claim 11 wherein, for each connection apparatus of the pair of connection apparatuses, the least first engagement structure is at least partially rounded and is rollable between the inboard support and the outboard support.

13. The weighing apparatus of claim 12 wherein, for each connection apparatus of the pair of connection apparatuses, the at least first engagement structure is at least one of generally cylindrical and generally spherical in shape.

14. The weighing apparatus of claim 12 wherein, for each connection apparatus of the pair of connection apparatuses, the number of engagement structures further comprise a polymeric abutment that is situated in at least one of the receptacle and the another receptacle and that is structured to be engageable by the at least first engagement structure to resist binding of the at least first engagement structure with another portion of the weighing apparatus.

15. The weighing apparatus of claim 4 wherein, for each connection apparatus of the pair of connection apparatuses:
the inboard support is elongated along the movement direction, the inboard lug and the another inboard lug being spaced apart from one another and being situated at opposite ends of inboard support; and
the outboard support is elongated along the movement direction, the outboard lug and the another outboard lug being spaced apart from one another and being situated at opposite ends of outboard support.

16. The weighing apparatus of claim 1 wherein, for each connection apparatus of the pair of connection apparatuses:
the inboard support comprises an elongated inboard shank;
the outboard support comprises an elongated outboard shank;
the inboard shank and the outboard shank confronting one another along a lateral direction that is generally transverse to the movement direction; and
at least a subset of the retention structures of the number of retention structures are interposed between the inboard shank and the outboard shank and are situated along at least a portion of the longitudinal extent of the inboard and outboard shanks, the at least subset of the retention structures being movable with respect to at least one of the inboard shank and the outboard shank to permit translational movement along the movement direction of at least one of the inboard support and the outboard support with respect to the other of the inboard support and the outboard support while resisting movement of the inboard shank and the outboard shank with respect to one another in the lateral direction.

17. The weighing apparatus of claim 16 wherein, for each connection apparatus of the pair of connection apparatuses, the at least subset of the engagement structures are each at least partially rounded and are rollable between the inboard shank and the outboard shank.

18. The weighing apparatus of claim 17 wherein, for each connection apparatus of the pair of connection apparatuses, the at least subset of the engagement structures are at least one of generally cylindrical and generally spherical in shape.

19. The weighing apparatus of claim 18 wherein, for each connection apparatus of the pair of connection apparatuses:
the inboard shank has an elongated receptacle formed along at least a portion of its longitudinal extent;
the outboard shank has another elongated receptacle formed along at least a portion of its longitudinal extent;
the receptacle and the another receptacle confronting one another along the lateral direction; and
at least a first engagement structure of the subset of the engagement structures is received in the receptacle and the another receptacle and is rollable with respect to at least one of the inboard shank and the outboard shank to permit translational movement along the movement direction of at least one of the inboard support and the outboard support with respect to the other of the inboard support and the outboard support while resisting movement of the inboard support and the outboard support with respect to one another in both the lateral direction and in a protrusion direction that is substantially orthogonal to the movement and lateral directions.

20. The weighing apparatus of claim 1 wherein:
the one of the first support and the second support has a ledge situated thereon that is engaged with the inboard supports and that provides vertical support thereto; and
the other of the first support and the second support has another ledge situated thereon that is engaged with the outboard supports and that provides vertical support thereto.

21. The weighing apparatus of claim 20 wherein:
the one of the first support and the second support has an indentation formed therein whose edge forms the ledge; and
the other of the first support and the second support has another indentation formed therein whose edge forms the another ledge.

22. A material handling device comprising the weighing apparatus of claim 1 and further comprising:
a lift mechanism on which the first support is situated;
a platform that is situated on the second support and that extends therefrom along a protrusion direction and generally away from the first support, the platform being structured to receive a load thereupon, the protrusion direction being substantially orthogonal to the movement direction; and
the pair of connection apparatuses being structured to resist movement of the second support in the protrusion direction with respect to the first support.

* * * * *